(12) United States Patent
Ellison et al.

(10) Patent No.: US 11,032,253 B2
(45) Date of Patent: *Jun. 8, 2021

(54) SECURE APPLICATION PROCESSING SYSTEMS AND METHODS

(71) Applicant: Intertrust Technologies Corporation, Sunnyvale, CA (US)

(72) Inventors: Gary Ellison, San Mateo, CA (US); Gilles Boccon-Gibod, San Francisco, CA (US); Pierre Chavanne, Davis, CA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 16/534,966

(22) Filed: Aug. 7, 2019

(65) Prior Publication Data

US 2020/0045024 A1 Feb. 6, 2020

Related U.S. Application Data

(63) Continuation of application No. 14/609,288, filed on Jan. 29, 2015, now Pat. No. 10,419,400.

(Continued)

(51) Int. Cl.
| | | |
|---|---|---|
| *H04L 29/06* | (2006.01) | |
| *G06F 21/10* | (2013.01) | |
| *G06F 21/72* | (2013.01) | |

(52) U.S. Cl.
CPC .......... *H04L 63/0428* (2013.01); *G06F 21/10* (2013.01); *G06F 21/72* (2013.01); *H04L 2463/061* (2013.01); *H04L 2463/101* (2013.01)

(58) Field of Classification Search
CPC ........... H04L 63/0428; H04L 2463/061; H04L 2463/101; G06F 21/10; G06F 21/72
See application file for complete search history.

(56) References Cited

U.S. PATENT DOCUMENTS

| 7,382,882 B1 | 6/2008 | Immonen |
| 8,234,387 B2 | 7/2012 | Bradley et al. |

(Continued)

FOREIGN PATENT DOCUMENTS

WO    WO 2005/003939 A1    1/2005

OTHER PUBLICATIONS

International Search Report and Written Opinion dated Apr. 21, 2015; PCT Application No. PCT/US2015/013595; 8 pages.

(Continued)

*Primary Examiner* — Joseph P Hirl
*Assistant Examiner* — Chi D Nguy
(74) *Attorney, Agent, or Firm* — Finnegan, Henderson, Farabow, Garrett & Dunner, LLP

(57) ABSTRACT

Systems and methods are described for securely and efficiently processing electronic content. In one embodiment, a first application running on a first computing system establishes a secure channel with a second computing system, the secure channel being secured by one or more cryptographic session keys. The first application obtains a license from the second computing system via the secure channel, the license being encrypted using at least one of the one or more cryptographic session keys, the license comprising a content decryption key, the content decryption key being further encrypted using at least one of the one or more cryptographic session keys or one or more keys derived therefrom. The first application invokes a second application to decrypt the license using at least one of the one or more cryptographic session keys, and further invokes the second application to decrypt the content decryption key using at least one of the one or more cryptographic session keys or one or more keys derived therefrom, and to decrypt a piece of content using the content decryption key. The first applica- (Continued)

tion then provides access to the decrypted piece of content in accordance with the license.

17 Claims, 2 Drawing Sheets

Related U.S. Application Data

(60) Provisional application No. 61/932,994, filed on Jan. 29, 2014.

(56) References Cited

U.S. PATENT DOCUMENTS

| | | | |
|---|---|---|---|
| 8,776,216 B2 | 7/2014 | Boccon-Gibod et al. | |
| 8,874,896 B2 | 10/2014 | Boccon-Gibod et al. | |
| 2007/0276760 A1 | 11/2007 | Kanehara et al. | |
| 2009/0086978 A1 | 4/2009 | McAvoy et al. | |
| 2010/0027790 A1 | 2/2010 | Vembu et al. | |
| 2010/0153717 A1* | 6/2010 | Sandler | H04L 9/0819 713/168 |
| 2010/0228971 A1* | 9/2010 | Carles | H04N 21/25816 713/163 |
| 2011/0145562 A1 | 6/2011 | Mangalore | |
| 2013/0047264 A1 | 2/2013 | Bjorkengren et al. | |
| 2013/0191930 A1 | 7/2013 | MacKay et al. | |
| 2014/0143885 A1* | 5/2014 | Blotsky | H04L 63/10 726/27 |
| 2014/0196079 A1 | 7/2014 | Jannard et al. | |
| 2015/0013014 A1 | 1/2015 | Daniel et al. | |
| 2015/0186621 A1* | 7/2015 | Uy | G06F 21/10 726/26 |

OTHER PUBLICATIONS

Wesley Chou, "Inside SSL: The Secure Sockets Layer Protocol", Jul./Aug. 2002 IT Pro, IEEE, 1520-9202/02, pp. 47-52.

* cited by examiner

SECURE APPLICATION PROCESSING SYSTEMS AND METHODS

RELATED APPLICATIONS

This application is a Continuation of U.S. application Ser. No. 14/609,288, filed Jan. 29, 2015, and entitled "SECURE APPLICATION PROCESSING SYSTEMS AND METHODS," which claims the benefit of priority under 35 U.S.C. § 119(e) to U.S. Provisional Patent Application No. 61/932,994, filed Jan. 29, 2014, and entitled "SECURE APPLICATION PROCESSING SYSTEMS AND METHODS", which is hereby incorporated by reference in its entirety.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND SUMMARY

Systems and methods are disclosed for more efficiently (and/or securely) using secrets (e.g., cryptographic keys and/or the like) to protect digital content or other data (e.g., digital media content, other cryptographic keys, and/or the like). For example, in one embodiment a system is disclosed in which a client application facilitates the establishment of a secure channel with a server using an application programming interface with a secure processing environment (e.g., a secure processor running on the client system). The client application receives data over the secure channel, encrypted using keying material determined during the establishment of the channel. The client application invokes the secure processing environment to decrypt the encrypted data, which data includes data further encrypted with the aforementioned keying material (or additional keying material derived therefrom or otherwise related thereto). The client application further invokes the secure processing environment to decrypt this additional encrypted data, which the secure processing environment does, using keying material determined during the establishment of the channel with the server (or information derived therefrom or related thereto). In some embodiments the secure processing environment passes the decrypted data back to the application. In other embodiments, the secure processing environment uses the decrypted data to perform further processing, the results of which are returned to the application. For example, in one embodiment, the secure processing environment uses keying material determined during the establishment of a secure channel to decrypt a content decryption key which it then uses to decrypt media content, which is then returned to the client application.

BRIEF DESCRIPTION OF THE DRAWINGS

The inventive body of work will be readily understood by referring to the following detailed description in conjunction with the accompanying drawings, in which.

DETAILED DESCRIPTION

Figure 1:
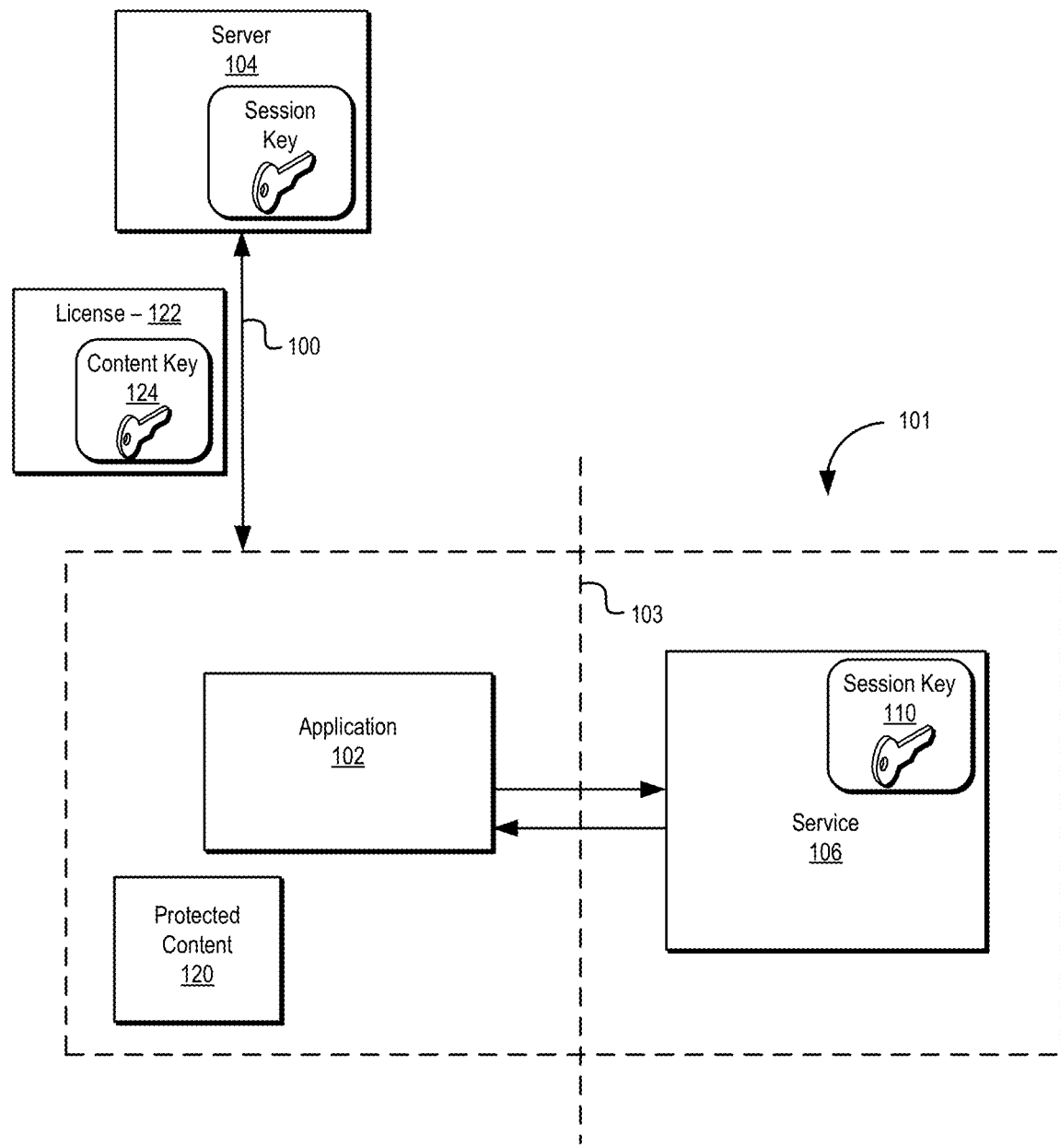
FIG. 1 illustrates an example system consistent with embodiments of the present disclosure.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Some embodiments of the disclosure may be understood by reference to the drawings, wherein like parts may be designated by like numerals. The components of the disclosed embodiments, as generally described and illustrated in the figures herein, could be arranged and designed in a wide variety of different configurations. Thus, the following detailed description of certain illustrative embodiments is not intended to limit the scope of the disclosure, as claimed, but is merely representative of possible embodiments of the disclosure. In addition, the steps of any method disclosed herein do not necessarily need to be executed in any specific order, or even sequentially, nor need the steps be executed only once, unless otherwise specified.

Systems and methods are presented for facilitating the secure and efficient processing of electronic content. The systems and methods described herein can, for example, be used in connection with digital rights management ("DRM") technology such as that described in commonly assigned, co-pending U.S. patent application Ser. No. 11/583,693, filed Oct. 18, 2006 ("the '693 application"), service orchestration and DRM technologies such as those described in commonly assigned U.S. Pat. No. 8,234,387 ("the '387 patent"), the application programming interface and Secure Key Box (SKB) technology described in commonly assigned U.S. Pat. No. 8,874,896 ("the '896 patent") (the contents of the '693 application, the '387 patent, and the '896 patent are hereby incorporated by reference in their entirety herein), and in other contexts as well. It will be appreciated that these systems and methods are novel, as are many of the components, systems, and methods employed therein.

Many distributed applications rely on transport security mechanisms (e.g., TLS (Transport Layer Security), SSL (Secure Sockets Layer), IPSEC (Internet Protocol Security), etc.) to construct a secure authenticated channel (SAC) that is used to transfer confidential information between the application endpoints (e.g., client and service). However, these mechanisms only protect the data in transit such that once the data is received by the application endpoint the confidentiality protection no longer persists.

There a numerous usage scenarios whereby an application may require that some or all of the exchanged data maintain its confidentiality protection outside of the SAC. For example, a DRM-enabled client application (e.g., an application that makes use of a DRM engine such as described in the '693 application or the '387 patent) may request a service to provide it with the necessary rights information to enable consumption of encrypted media content. This rights information typically includes media encryption key(s) that may need persistent protection. One method to ensure this is to have an adjunct key management system implemented to persistently protect confidential application information, such as the media keys. For example, the media decryption keys may themselves be encrypted using separate keys maintained as secrets by the adjunct key management system (e.g., device specific keys). However, this approach can have a significant impact on implementation.

A more efficient and lightweight mechanism is possible. Given the fact that the two endpoints have established a SAC, and that, generally speaking, a session key has been exchanged or derived by the transport security mechanism, then the endpoints at the application layer could greatly benefit if there were a mechanism by which the application endpoints could use this session key (or a derivation of it).

Merely exposing the session key to the application layer does not imbue any additional security properties. But when used in conjunction with secure cryptographic tokens (e.g., a PKCS #11 token, Hardware Security Module (HSM), Smartcard, or the application programming interface (API) and Secure Key Box (SKB) technology described in the '896 patent) then the application endpoints can maintain the secrecy of the session key and use it (or a derivative of it) to protect the confidentiality of the application data (e.g., the media decryption keys).

In one embodiment, if the application is assumed to be secure (e.g., its code is protected), but data could be snooped by external monitoring hardware and/or software, then the approach described above should be sufficient to protect against exposing the DRM keys, as the trusted application code will not directly decrypt the keys but will instead request a secure service, e.g., a secure key box such as that described in the '896 patent, to create a new secret data object by unwrapping the media keys with the SAC key as the wrapping key.

In another embodiment, if the application code cannot be assumed to be safe against modifications, another secret available to the secure key box (or other security service or API) and to the server (but inaccessible to the client application), which the secure key box would not allow to be used for decryption, but only for unwrapping into another secure object, could be used to protect the media keys in such a way that even a modified application could not gain access to the DRM keys. This additional secret could be either a symmetric secret, or an asymmetric key that might be easier to manage across SKB and server environments.

FIG. 1 is an illustration of a system in accordance with some embodiments of the inventive body of work. As shown in FIG. 1, an application 102 is in communication with a server 104. Although application 102 may comprise any form of application, in some embodiments application 102 may comprise, for example, a web browser or other media consumption application (e.g., a video player, e-reader, music player, etc.). In some embodiments application 102 may be integrated with a DRM engine, while in other embodiments, the DRM engine may be a distinct application with which application 102 communicates. In other embodiments, no DRM engine is used.

Referring once again to FIG. 1, application 102 is also in communication with a service 106. Service 106 may, for example, comprise a secure key box, as described in the '896 patent, a hardware security module, a smartcard, a secure processing unit, or some other cryptographic/security token. In some embodiments, application 102 communicates with service 106 via an application programming interface (API) 103: for example, an API such as that described in the '896 patent, a PKCS #11 API, and/or the like. In some embodiments, service 106 is present on the same local computer system as application 102, while in other embodiments the service 106 is hosted on a remote site.

More generally, FIG. 1 illustrates a communication channel 100 between two endpoints 101 and 104, in which one endpoint 101 comprises two zones 102 and 106 with different levels of access to the data sent over the communication channel 100. In one embodiment, communication channel 100 comprises a secure authenticated channel (SAC), enabling the two endpoints 101 and 104 to encrypt and/or decrypt data sent over the channel 100. Alternatively, or in addition, the channel may support authentication of this data. The secure channel 100 can be established in accordance with any suitable protocol or protocols, including, for example TLS, IPSEC, SSL, and/or the like. As part of the protocol, the endpoints establish one or more session keys via any suitable mechanism (e.g., using a key agreement protocol, pre-shared keys, key distribution, and/or the like).

Data sent over channel 100 is encrypted or otherwise protected. When, for example, endpoint 104 sends encrypted data over channel 100 to endpoint 101, endpoint 101 uses the appropriate session key to process the data (e.g., decrypt the data, parse it, and/or otherwise make use of the data). In accordance with an embodiment of the inventive body of work, within endpoint 101, application 102 does not have direct access to the session key. Instead, it relies on service 106 to establish and maintain the session key, and to make use of the session key to decrypt and/or authenticate data received over channel 100. This process can be designed to be transparent to application 102, which may simply invoke service 106 using an API 103 to, for example, establish the secure channel 100 with endpoint 104, decrypt data received from 104 over channel 100, encrypt data to send to endpoint 104, and/or the like. Thus, application 102 can make use of the session key, while not having direct access to the key itself, which remains secured by service 106. Application 102 will thus have access to data protected by the key, but will make use of service 106 to actually unwrap the data.

As previously indicated, in some embodiments application 102 may comprise a media consumption application and/or other application designed to render and/or otherwise use protected content or other information 120 (e.g., view encrypted documents, play encrypted movies, television shows, or other videos, play encrypted songs, run encrypted or otherwise protected applications, and/or the like). The protected content 120 can be received or accessed by application 102 in any suitable manner. For example, it could be downloaded in encrypted form from server 104 or some other server or system, received on media such as a disc or flash memory drive, and/or the like. It will often be the case that with relatively large pieces of content, the server will have pre-encrypted the content before it is requested by application 102, since dynamically encrypting the content upon request may be overly time and/or resource consuming.

In order to make use of the content 120, application 102 may need to obtain an associated license 122 specifying rules governing access to the content 120. The license 122 may also comprise one or more encrypted keys 124, or keying material from which keys can be derived, which can be used, once decrypted, to decrypt, authenticate, and/or otherwise enable access to the encrypted content 120.

As shown in FIG. 1, application 102 obtains the license 122 over secure channel 100. Application 102 makes use of service 106 to decrypt the license using the session key 110 established during creation of channel 100. Application 102 then parses the license to obtain, e.g., the rules contained therein, and the encrypted keys 124. When application is invoked to access protected content 120 (e.g., when a user presses "play"), the application enforces the rules or other license restrictions, and, if permitted by the rules, causes the content 120 to be decrypted and accessed (e.g., played or otherwise rendered). To decrypt the content 120, application 102 invokes service 106 to decrypt keys 124 using the session key 110 (or one or more keys derived therefrom), and then to decrypt content 120 using keys 124. In this manner, the content keys 124 are not exposed in decrypted form to application 102 (thereby making unauthorized access to or dissemination of the keys more difficult), and server 104 is saved the inconvenience of having to establish via a separate protocol a separate key with service 106 to encrypt/decrypt keys 124, relying instead on the session key(s) 110 (or information derived therefrom) already established during creation of the secure channel 100.

It will be appreciated that the foregoing description has been provided to facilitate understanding of an example embodiment of the inventive body of work, and that a number of modifications could be made without departing from the spirit thereof. For example, without limitation, in some embodiments, the protected content itself could be encrypted with the session key, rather than a separate key which is encrypted with the session key. In such an embodiment, for example, the application may be written to understand this convention, or the license may contain data that, when sent for processing to the secure processor, will indicate that this is the case. Moreover, it will also be appreciated that while, for ease of explanation, the description herein frequently refers to "the" session key, it will be appreciated that in some embodiments multiple session keys (or keying material) may be used instead, and thus references to "the session key" should be understood to encompass these embodiments as well.

Figure 2:
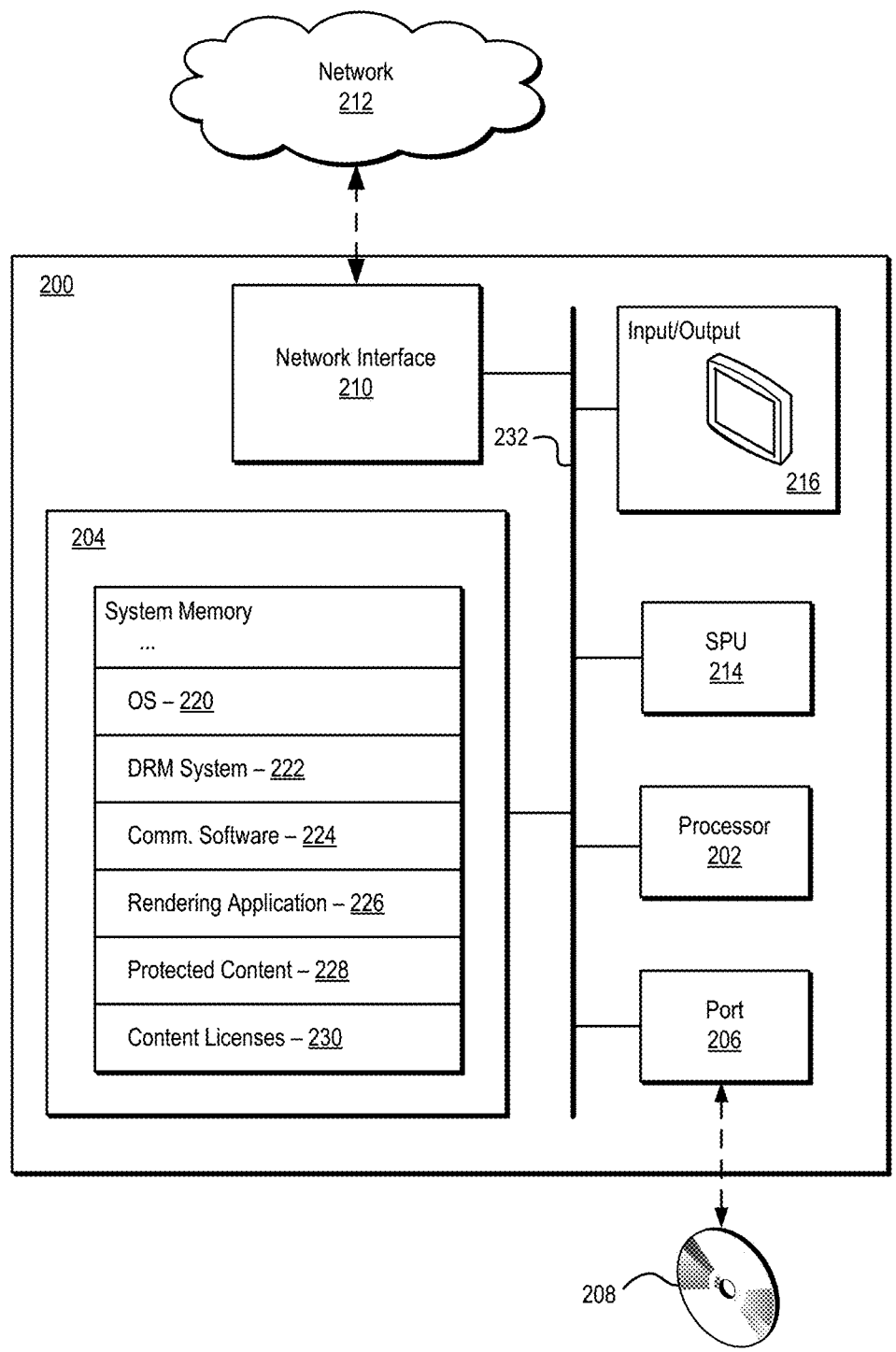
FIG. 2 illustrates a system that may be used to implement certain embodiments of the systems and methods of the present disclosure.

FIG. 2 illustrates a system 200 that may be used to implement certain embodiments of the systems and methods of the present disclosure. The system 200 may, for example, comprise a smartphone, a portable audio or video player, a tablet computer system, a server computer system, a personal computer, and/or any other system configured to implement the systems and methods described herein. In certain embodiments, the system 200 may perform certain functions associated with endpoints 104 and 101 in the example described above in connection with FIG. 1.

As illustrated in FIG. 2, system 200 may include: a processor 202; system memory 204, which may include high speed RAM, non-volatile memory and/or one or more bulk non-volatile computer-readable storage mediums (e.g., a hard disk, flash memory, etc.) for storing programs and other data for use and execution by the processor 202; an interface 216 (e.g., an input/output interface) that may include a display and/or one or more input devices such as, for example, a touchscreen, a keyboard, a mouse, a track pad, and the like; a port 206 for interfacing with removable memory 208 that may include one more diskettes, optical storage mediums, and/or other computer-readable storage mediums (e.g., flash memory, thumb drives, USB dongles, compact discs, DVDs, etc.); a network interface 210 for communicating with other systems via a network 212 using one or more communication technologies; and one or more buses 232 for communicatively coupling the aforementioned elements.

In certain embodiments, network 212 may comprise the Internet, a local area network, a virtual private network, and/or any other communication network utilizing one or more electronic communication technologies and/or standards (e.g., Ethernet or the like). In some embodiments, the network interface 210 and/or network 212 may be part of a wireless carrier system, such as a PCS, and/or any other suitable communication system incorporating any suitable communication standards and/or protocols. In further embodiments, the network interface 210 and/or network 212 may be part of an analog mobile communications network and/or a digital mobile communications network utilizing, for example, CDMA, GSM, FDMA, and/or TDMA standards. In still further embodiments, the network interface 210 and/or network 212 may incorporate one or more satellite communication links and/or use IEEE's 802.11 standards, near-field communication, Bluetooth®, UWB, Zigbee®, and or any other suitable standard or standards.

In some embodiments, the system 200 may alternatively, or in addition, include a SPU 214 that is protected from tampering by a user of system 200 or other entities by utilizing secure physical and/or virtual security techniques. An SPU 214 can help enhance and/or facilitate the security of sensitive operations such as private management of secret or other secure information, and other aspects of the systems and methods disclosed herein. In certain embodiments, the SPU 214 may operate in a logically secure processing domain and be configured to protect and operate on secret information. In some embodiments, the SPU 214 may include internal memory storing executable instructions or programs configured to enable the SPU 214 to perform secure operations.

The operation of system 200 may be generally controlled by the processor 202 and/or 214 operating by executing software instructions and programs stored in the system memory 204 (and/or other computer-readable media, such as removable memory 208). The system memory 204 may store a variety of executable programs or modules for controlling the operation of the system 200. For example, the system memory 204 may include an operating system ("OS") 220 that may manage and coordinate, at least in part, system hardware resources and provide for common services for execution of various applications and a DRM system 222 for implementing trust and privacy management functionality including protection and/or management of secret information. The system memory 204 may further include, without limitation, communication software 224 configured to enable in part communication with and by the system 200, a content rendering application (e.g., a media player or reader) 226, as well as protected content 228, licenses associated therewith 230, and/or any other information and/or applications configured to implement embodiments of the systems and methods disclosed herein.

One of ordinary skill in the art will appreciate that the systems and methods described herein can be practiced with computing devices similar or identical to that illustrated in FIG. 2, or with virtually any other suitable computing device, including computing devices that do not possess some of the components shown in FIG. 2 and/or computing devices that possess other components that are not shown. Thus it should be appreciated that FIG. 2 is provided for purposes of illustration and not limitation.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic tape, a magnetic disk, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein, but may be modified within the scope and equivalents of the appended claims.

What is claimed is:

1. A method performed by a first application running on a first computing system, the method comprising:
    invoking a second application running in a secure execution environment separate from an execution environment of the first application to establish a secure channel between the second application and a second computing system, the secure channel being secured by one or more protected cryptographic session keys, wherein the one or more protected cryptographic session keys are not exposed to the first application;
    invoking the second application to obtain a license from the second computing system, the license comprising a content decryption key, the content decryption key being further encrypted, at least in part, using at least one of the one or more protected cryptographic session keys;
    invoking the second application to decrypt the content decryption key included in the license using, at least in part, at least one of the one or more protected cryptographic session keys; and
    receiving access to the piece of content.

2. The method of claim 1, wherein receiving access to the piece of content comprises receiving the decrypted piece of content from the second application.

3. The method of claim 1, wherein the license is encrypted using, at least in part, at least one of the one or more protected cryptographic session keys.

4. The method of claim 3, wherein the method further comprises invoking the second application to decrypt the license using, at least in part, at least one of the one or more protected cryptographic session keys.

5. The method of claim 1, wherein the one or more protected cryptographic session keys are not exposed to the first application by the second application.

6. The method of claim 1, wherein the decrypted content decryption key is not exposed to the first application by the second application.

7. The method of claim 1, wherein the second application executes on the first computing system.

8. The method of claim 1, wherein the second application comprises a secure key box application.

9. The method of claim 1, wherein the second application is invoked by the first application via an application programming interface.

10. The method of claim 1, wherein the second application comprises a firmware application executing on a secure processing unit.

11. The method of claim 1, wherein the first application comprises a web browser application.

12. The method of claim 1, wherein the first application comprises a media player application.

13. The method of claim 1, where the method further comprises receiving, by the first application, a request to access the piece of content.

14. The method of claim 1, wherein the content decryption key is encrypted using at least one derived key generated based on at least one of the one or more protected cryptographic session keys.

15. The method of claim 14, wherein invoking the second application to decrypt the content decryption key comprises generating the at least one derived key using at least one of the one or more protected cryptographic session keys and decrypting the content decryption key using the generated at least one derived key.

16. The method of claim 15, wherein generating the at least one derived key further comprises generating the at least one derived key using secret information shared by the second application and the second computing system.

17. The method of claim 16, wherein the secret information is not exposed to the first application by the second application.

* * * * *